(12) United States Patent
Robert

(10) Patent No.: US 7,373,663 B2
(45) Date of Patent: May 13, 2008

(54) SECRET HASHING FOR TCP SYN/FIN CORRESPONDENCE

(75) Inventor: Jean-Marc Robert, Ottawa (CA)

(73) Assignee: Alcatel Canada Inc., Kanata, ON (CA)

( * ) Notice: Subject to any disclaimer, the term of this patent is extended or adjusted under 35 U.S.C. 154(b) by 837 days.

(21) Appl. No.: 10/316,883

(22) Filed: Dec. 12, 2002

(65) Prior Publication Data
US 2003/0226032 A1 Dec. 4, 2003

Related U.S. Application Data

(63) Continuation-in-part of application No. 10/158,115, filed on May 31, 2002.

(51) Int. Cl.
*G06F 11/00* (2006.01)
*G06F 12/14* (2006.01)
*G06F 12/16* (2006.01)
*G06F 15/18* (2006.01)
*G08B 23/00* (2006.01)

(52) U.S. Cl. ...................................................... 726/22
(58) Field of Classification Search ...................... None
See application file for complete search history.

(56) References Cited

U.S. PATENT DOCUMENTS 5,542,089 A   7/1996   Lindsay et al.
5,958,053 A * 9/1999   Denker ........................... 726/1
6,321,338 B1  11/2001  Porras et al. ................ 713/201
2002/0032880 A1* 3/2002 Poletto et al. .................. 714/4
2003/0002533 A1* 1/2003 Rajwan ....................... 370/474
2003/0135625 A1* 7/2003 Fontes et al. ............... 709/228
2003/0200441 A1* 10/2003 Jeffries et al. .............. 713/181

FOREIGN PATENT DOCUMENTS

EP   1 154 610 A2   11/2001

OTHER PUBLICATIONS

Snoeren et al., "Hash-Based IP Traceback," ACM SIGCOMM 2001, pp. 7-11.*
Duffield et al., "Properties and Prediction of Flow Statistics from Sampled Packet Streams," AT&T Labs-Research, (c)2002 ACM, pp. 159-170.*
"Detecting SYN flooding attacks", Haining Wang et al., 2002 IEEE.
"Analysis of a denial of service attack on TCP", Christoph L. Schuba et al., 1997 IEEE.

* cited by examiner

*Primary Examiner*—Matthew Smithers
*Assistant Examiner*—Nadia Khoshnoodi

(57) ABSTRACT

A mechanism for detecting denial of service attacks in a digital communications system is described. A probabilistically determined portion of input packets of a connection are processed using a hash function to determine whether the packets belong to the flow initiated by a TCP SYN packet. The hash function includes a secret key for additional security. The result of the hash function is added to a value which is dependent on the sequence number of a packet being processed.

11 Claims, 3 Drawing Sheets

SECRET HASHING FOR TCP SYN/FIN CORRESPONDENCE

RELATED APPLICATION

This application is a continuation in part application of U.S. Ser. No. 10/158,115 filed May 31, 2002.

FIELD OF THE INVENTION

This invention relates, generally, to computer based systems and more particularly to methods of detecting security related attacks in such systems.

BACKGROUND

Attacks on web sites in recent years have resulted in severe disruption in network services. These attacks can take any one of a number of forms including, but not limited to, SYN flooding or denial of service attacks.

In a SYN flooding attack an attacker overloads a victim's site to the point where it cannot cope with incoming traffic. Such an attack, typically, focuses on an inherent characteristic of TCP based services.

Essentially, TCP services rely on a three-way hand shaking protocol on connection set up. A client wishing to make connection with a host sends a synchronization signal (SYN) to the host and the host responds to the client with a SYN acknowledgement (ACK) reply. The client then returns an acknowledgement and the connection is established. The handshaking protocol is illustrated in FIG. 1.

Upon completion of a connection the client forwards a finish (FIN) packet to the host indicating that there will be no further data or packets directed to the host and the connection is thereafter closed.

In a SYN flooding attack the attacker will typically use a false or invalid source address such that when the host returns the SYN/ACK message it does not reach a valid client. Under the TCP protocol the host stores half opened connections i.e. connections for which the third leg of the three way protocol has not been completed for a set period of time or until a system time out occurs. If, during this time interval, multiple new half opened connections are established at the host site the memory allocated to retaining such connections becomes swamped and eventually is unable to receive any more SYN packets. At this stage the server or host will crash or will not respond to any new connections and the site goes out of service. Because the host is unable to receive further data the attacker has been successful in generating what is known as a denial of service attack. Denial of service attacks have become an increasingly prevalent form of security threat and the problem, so far, has been quite difficult to solve. Several countermeasures have been proposed and can be characterized as firewall and router filtering, operating system improvements, protocol improvements and intrusion detection.

Considerable prior art exists in the area of security attacks and the problem is well described in a publication by C. Schuba, I. Krsul, M. Kuhn, E. Spafford, A. Sundaram and D. Zamboni entitled "Analsyis of a denial of service attack on TCP", published in the Proc., 1997 IEEE Symp. Security and Privacy. The Schuba et al. paper describes the problem and the classical solutions for a proxy service: the TCP relay and the semitransparent TCP gateway. In those two solutions, a fire wall intercepts the TCP connections, maintains the states of the TCP state machine and introduces new packets to avoid the attacks.

The proxy solutions according to this publication have to maintain, for each connection, the states of the corresponding TCP state machine. This mechanism needs a lot of resources and can be itself the target of a new denial of service attack. Thus, the high cost of the computation overhead makes this solution inappropriate for network routers or switches.

A second prior art solution which is closer to the present invention is described by H. Wang, D. Zhang and K. G. Shin, "Detecting SYN flooding attacks", Proc. Infocom 2002. The method according to Wang et al. relies on a counting argument on the SYN and FIN packets on the TCP connections. Those packets should go in pairs in any well behaved connection. Thus, the number of SYN packets should match roughly the number of FIN packets. The simplicity of this method lies in the stateless and low computation overhead which makes the detection mechanism itself immune to flooding attacks. This simplicity allows the detection to be performed in the leaf routers that connect end hosts to the Internet.

The counter mechanism according to Wang et al. has a major drawback. If attackers know exactly the detection protocol described by this method they may thwart this approach simply by overflooding the routers with synchronized SYN and unrelated, often invalid FIN packets. Hence the SYN counter and the FIN counter would be roughly the same. However, the victim's TCP/IP stack would be open to many half-opened connections that would not be closed by the invalid FIN packets. This corresponds to the original denial of service attack.

U.S. Pat. No. 6,321,338 which issued Nov. 20, 2001 to Porras et al. and entitled "Network Surveillance", also provides prior art for this technology. According to the Porras et al. patent there is provided a method of network surveillance including receiving network packets handled by a network entity and building at least one long term and at least one short term statistical profile from a measure of the network packets that monitors data transfers, errors or network connections. A comparison of the statistical profiles is used to determine whether the difference between the statistical profiles indicates suspicious network activity.

The U.S. Pat. No. 6,321,338 further discloses, in addition to the details mentioned above, that intensity measures of event streams e.g. ICMP packets, are particularly suited for detecting flooding attacks. Furthermore, the patent discloses that intensity measures that correlate SYN to SYN_ACK messages, volume analysis of SYN/RST messages or TCP/FIN messages are useful to detect port availability or scanning attacks.

A second patent of interest is U.S. Pat. No. 5,958,053 which issued on Sep. 28, 1999 to Denker entitled "Communications protocol with improved security". According to the Denker patent the invention therein includes two new first level protocols and several embodiments of a second level protocol. The two new first level protocols of the invention include the TCP2B protocol and the TCP2E protocol. In the TCP2B protocol both client and server indicate their support for this protocol using one or more bits in the TCP header. According to the TCP2B protocol the client retransmits its requested options in the ACK message so the server need not store the options after the connection request. In the TCP2E protocol the server maintains a Friends Table listing addresses of devices recently observed to be in compliance with TCP. If a client's address is on the Friends Table the connection request is processed according to TCP. Otherwise the server sends an acknowledge message to the client to prompt the client to send a reset (RST) message. The client's address can then be added to the Friends Table.

The U.S. Pat. No. 5,958,053 discloses the use of a hashing function on the source and destination IP addresses and port numbers plus a secret key, known only to the server to differentiate SYN packets. Additionally, the patent discloses keeping a hash table that includes counters corresponding to respective clients to detect unsuccessful attempts as would occur with a SYN flood attack. Each counter is decremented after receiving a SYN message from its corresponding service and incremented when a successful connection is established between the client and the server upon the reception of the ACK from the client.

Denial of service of attacks often employ TCP setup SYN messages to flood target stacks with fake connection attempts. In order to detect such attacks a number of statistics-based heuristics have been developed which count SYN versus FIN messages and flag a skew as an attack. Unfortunately, the attacker can fool a number of these systems by flooding with as many FINs as SYNs but keeping the FINs unrelated to the SYNs.

This is detectable also if the detection system is willing to maintain a table of all SYNs and only counting those FINs which correspond to a valid SYN. Unfortunately, in high bandwidth applications it may not be possible to maintain such a large table of connections.

The solution provided by U.S. Pat. No. 5,958,053 just monitors the connections based on the IP addresses and port numbers.

The best prior art solutions known to the inventors observe traffic and accumulate statistics based on SYNs versus FINs, and flagging an attack if a discrepancy exists. There is no correspondence check between the outgoing SYNs and incoming FINs. This leaves a hole which is also exploitable by a savvy attacker since the attacker can flood a victim with SYN packets and non-corresponding FIN packets. The victim accumulates half-opened connections and the detector is fooled.

Co-pending application Ser. No. 10/158,115 the contents of which are incorporated herein by reference discloses an improvement on the prior art by maintaining a correspondence between SYNs and FINs thereby closing the security hole. This is done by using a hashing function to map SYN messages to corresponding FIN messages.

The aforementioned application also provides a coherent way to deal with reset packets.

SUMMARY OF THE INVENTION

The present invention addresses a mechanism which determines the correspondence between SYN packets and FIN packets. It reinforces the mechanism introduced in co-pending application Ser. No. 10/158,115 by using sequence numbers in the computation. According to the present invention it would not be possible to circumvent the reinforced mechanism with a single attacking tool program which does not get explicit information from a victim of an attack.

Therefore in accordance with the present application there is provided a method of detecting a denial of service attack on a connection in a digital communications system, the method comprising the steps of: a) calculating, for a connection establishing packet during a predetermined time interval, a first value using a hash function with source and destination IP addresses, source and destination port numbers and a secret key as input parameters; b) processing a portion of subsequent packets by adding the first value to a second value that is dependent on a sequencing number of each processed subsequent packet and the predetermined time interval to derive respective indexes to a hash table, the hash table having counter values of current, previous and next buckets to which the processed packets are mapped; and c) determining whether there is a denial of service attack by evaluating respective indexes, an attack being indicated when an index value calculated from a processed packet does not point to a current, previous or next bucket that has a counter value greater than zero.

BRIEF DESCRIPTION OF THE DRAWINGS

The invention will now be described in greater detail with reference to the attached drawings wherein.

DETAILED DESCRIPTION OF THE INVENTION

Figure 1:
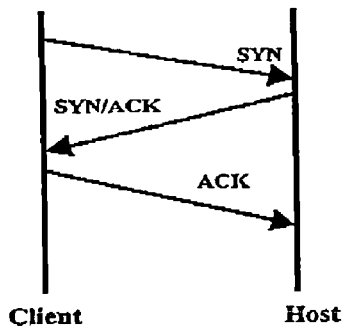
FIG. 1 illustrates the TCP initiating protocol.

FIG. 1 illustrates the TCP/IP protocol for initiating a connection from a client to a host or server. The client sends a connection initiating message (SYN) to the server who responds with a SYN/ACK message sent back to the client. The client returns an acknowledgement message which fully opens the connection.

Upon completion of a session the client sends a FIN or connection terminating message to the host or server which acknowledges the message and the server returns an acknowledgement to formally close the connection.

As discussed previously if the third leg of the connection initiating message i.e. the acknowledgement from the client to the server is not received at the server the server maintains a record of a half-opened connection and a plurality of such half-opened messages can overwhelm the server which will lead to a crash and interruption of the service.

Figure 2:
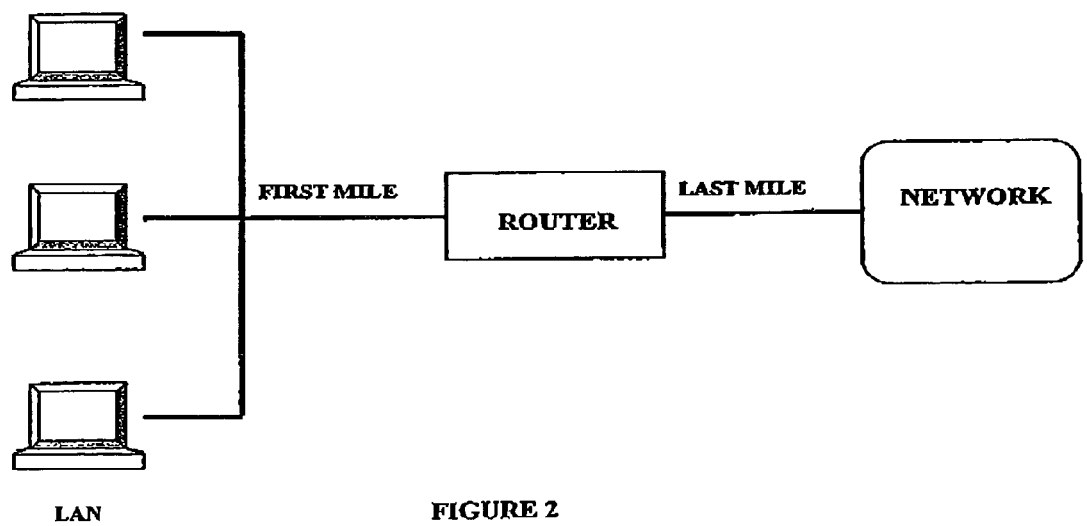
FIG. 2 is a high level illustration of an implementation of the present invention.

It is anticipated that the present invention will find particular application in a router at the edge of the Internet which provides access from a local area network to the Internet or network in general. It may also be used in a switch, a firewall, a host, etc. FIG. 2 is a high level diagram of this application showing the router which includes the mechanisms for carrying out the method of the present invention.

The SYN flood attacks can be detected efficiently by maintaining the states of connections with a hashing table. Such a system can be more efficient then other methods identified in the prior art. The associated hashing function must be collision resistant i.e. it must be computationally infeasible to find two couplets hashed in the same bucket. This can be achieved with a keyed function.

Therefore, in this invention, incoming signaling packets (SYN, SYN/ACK, FIN, RST) can be mapped to buckets by a secret hashing function and the statistics can be maintained on each bucket, rather than the entire system. A simple counter can be incremented on SYNs and decremented on FINs for each bucket. This way there can at least be a statistical correspondence between SYNs and FINs, and without knowledge of the mapping function, the attacker would have no way of faking the FINs to map to the same bucket (without corresponding to the same SYN). This relies on the assumption that an attacker has only two choices:

either completing the three-way handshake and, eventually, the connection or not completing the three-way handshake and leaving the client with a half-open connection.

The mapping function could hash [source IP, destination IP, destination port, key] to n buckets. The choice of n is a trade-off between higher demands on the checker and effectiveness of the system. As an example, n=100 would risk too many statistical collisions under attack (i.e. the system might not detect the attack underway); n=$10^6$ would be much better in terms of collisions; however, its storage requirements might be too great for a small router (for example). In fact, any efficient data structures supporting insertion, membership queries and optionally, deletion could be used (e.g. Bloom-filter with keyed hashing functions). The main issue is to have an efficient data structure for which the false positive membership queries are very low. This is the reason why the size of the table is huge.

The key parameter allows the hashing algorithm to be known, but the correspondence between [IPs, port] and bucket to be hidden from the attacker. Thus, the key would be a random number known only to the detection system.

A global counter would be maintained to track all open connections. It would be the heart of the logic that decides if an attack is underway.

Denial of service attacks have become an increasingly prevalent form of security threat and the problem appears to be quite difficult to solve because the attacks prey on intrinsic properties of the TCP/IP infrastructure. The present invention provides a means of detecting denial of service attacks that is more efficient and robust then known methods.

Thus, the invention is related to a method of detecting flooding type denial of service attacks in which the SYN messages are matched to the FIN messages by using a hash algorithm that includes use of a key for additional security.

The invention relies on a method of measuring connection establishing packets (SYN) and connection terminating packets (FIN) received at a router during a predetermined time interval. Information in the packets such as source and destination IP addresses, port numbers and a secret key are used to calculate a value using a hash function. The main distinguishing feature of the method would be the processing of a probabilistically determined portion of packets of a connection by using a hash algorithm to determine if the packets belong to the flow initiated by a TCP SYN packet. The hash algorithm includes a secret key for additional security. The result of the hash algorithm is added to a value that is dependent on the sequence number (or optionally the ACK flag) of a packet being processed and the TCP window size of the connection to calculate an index to a hash table. All the buckets of the hash table contain a counter corresponding to the number of elements inserted in that bucket. If the index value calculated from a processed packet does not point to a current, previous, or next counter value that is greater than zero, then the processed packet does not belong to any flow initiated by a TCP SYN packet, and the processed packet will be discarded. As packets are processed the counter values in the buckets are maintained.

Typically, the bucket counts are reset at the end of the time interval which will be either a continuous sliding window or a non-overlapping sliding window.

The method of determining a denial of service attack relies on using any one of a cumulative sum, a moving average or a filter derivative to detect changes in the global counter.

A stronger correspondence is desired between the SYN and the FIN packets without parsing all the packets of the connections. The previous solutions either have to process each packets—too slow for a network equipment—or base their correspondence only on the IP addresses and TCP ports—too weak.

From the point of view of each participant, a TCP connection is initialized with a TCP SYN packet and terminated with a TCP FIN packet. The correspondence between these two packets can be established by monitoring the packet sequence numbers. Those numbers must increase according to some rules. The initial value of this sequence is determined by the Initial Sequence Number set in the TCP SYN packet.

An obvious way to determine without any doubt the correspondence between a TCP SYN packet and a TCP FIN packet is to simulate the window algorithm of the TCP protocol. This implies that all packets would have to be parsed.

To avoid this, a new mechanism is proposed based on secret hashing functions.

According to the new mechanism a hash table supports the following operations: Insertion, Deletion, and Query. One secret hashing function is associated to the table—in fact, more than one function can be required e.g. Bloom filters. The function must contain a secret argument to prevent a malicious attacker from thwarting this mechanism.

As discussed in co-pending application Ser. No. 10/158,115 the hash uses the following input parameters (SecretValue, $IP_{SOURCE}$, $IP_{DEST}$, $Port_{SOURCE}$, $Port_{DEST}$). Such function can be based on one-way hashing functions like MD5 or SHA-1.

The mechanism according to the invention is as follows:

Upon reception of a TCP SYN packet with $ISN_{SOURCE}$ as initial sequence number, update the table T as follows:

Insert an element—e.g. by adding 1 to a counter—in the table entry at index

Hash (SecretValue, $IP_{SOURCE}$, $IP_{DEST}$, $Port_{SOURCE}$, $Port_{DEST}$)+Floor ($ISN_{SOURCE}$/(TCP Window Size*t))

where t is some confidence number set to $2^{10}$. The Floor function can be defined as follow: Floor(x)=the greatest integer smaller than or equal to x.

For each subsequent packet of the connection,

Determine with probability p~0.01 if this packet has to be processed. If the packet falls within the probabilistic value it is processed by determining if the table entry at index Hash (SecretValue, $IP_{SOURCE}$, $IP_{DEST}$, $Port_{SOURCE}$, $Port_{DEST}$)+Floor (SN/(TCP Window Size*t))
(refer to as the current bucket)

or at index

Hash (SecretValue, $IP_{SOURCE}$, $IP_{DEST}$, $Port_{SOURCE}$, $Port_{DEST}$)+Floor (SN/(TCP Window Size*t))−1
(refer to as the previous bucket)

or at index

Hash (SecretValue, $IP_{SOURCE}$, $IP_{DEST}$, $Port_{SOURCE}$, $Port_{DEST}$)+Floor (SN/(TCP Window Size*t))+1
(refer to as the next bucket)

is greater than 0. The value SN refers to the packet sequence number. If this is the case, the packet is accepted. Otherwise, the packet is not recognized as belonging to the flow initiated by the TCP SYN packet. Since the sequence number of the packet is received subsequent to the initial sequence number increased the hash function plus the sequence number must be greater than the hash function for the initial SYN packet.

Finally, if the current bucket is empty and the previous one is not empty, one packet is added to the current bucket and one packet is deleted from the previous bucket. This is to make sure that the bucket that should contain the next packet progresses as the sequence numbers of the packets increases.

The confidence factor t assures with a good probability that the previous packet which has been processed—or the SYN packet—has been inserted in the current bucket or in the previous one.

Upon reception of a TCP FIN packet, process it as previously described. However, in such a case, if the TCP FIN packet is recognized as a valid one, the corresponding element in the hashing table is deleted from the current bucket or from the previous one. This also applies to the reception of the TCP RST packet FIGS. 3A and 3B are flow diagrams illustrating the new mechanism according to the present invention.

Figure 3A:
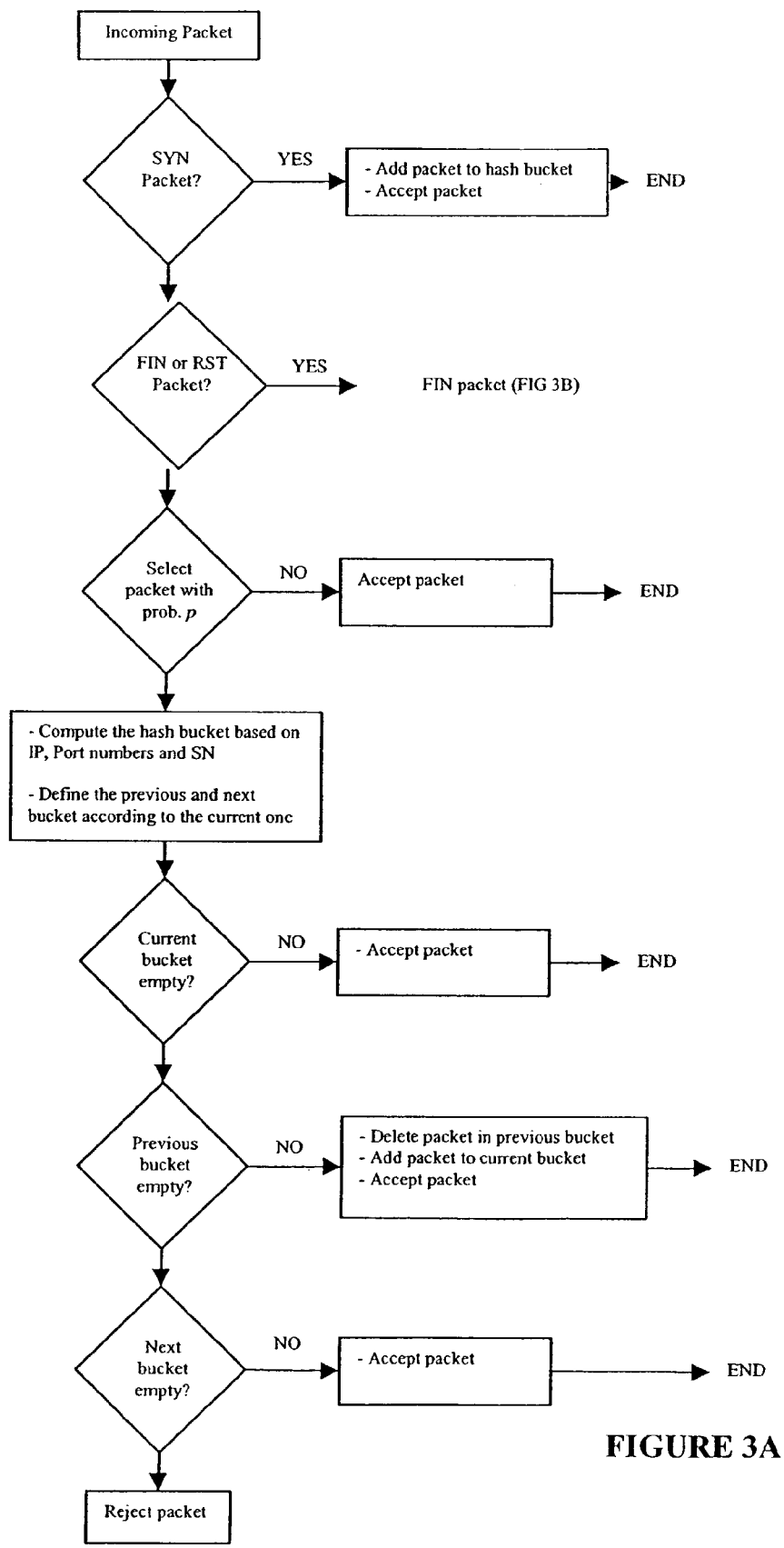
FIGS. 3A and 3B are flow diagrams illustrating the process according to the present invention.

As noted in FIG. 3A a portion of incoming packets different than SYN, FIN or RST packets which fall within the selection criteria p are processed in order to compute the hash bucket based on IP port numbers and the sequence number. At that time the previous and next bucket are defined relative to the current one. If the current bucket is not empty the packet is accepted. If it is empty then it is determined whether the previous bucket is empty. If it is not empty the packet in the previous bucket is deleted and the packet is added to the current bucket. If the previous bucket is also empty it is determined whether the next bucket is empty. If it is the packet is rejected otherwise it is accepted.

Figure 3B:
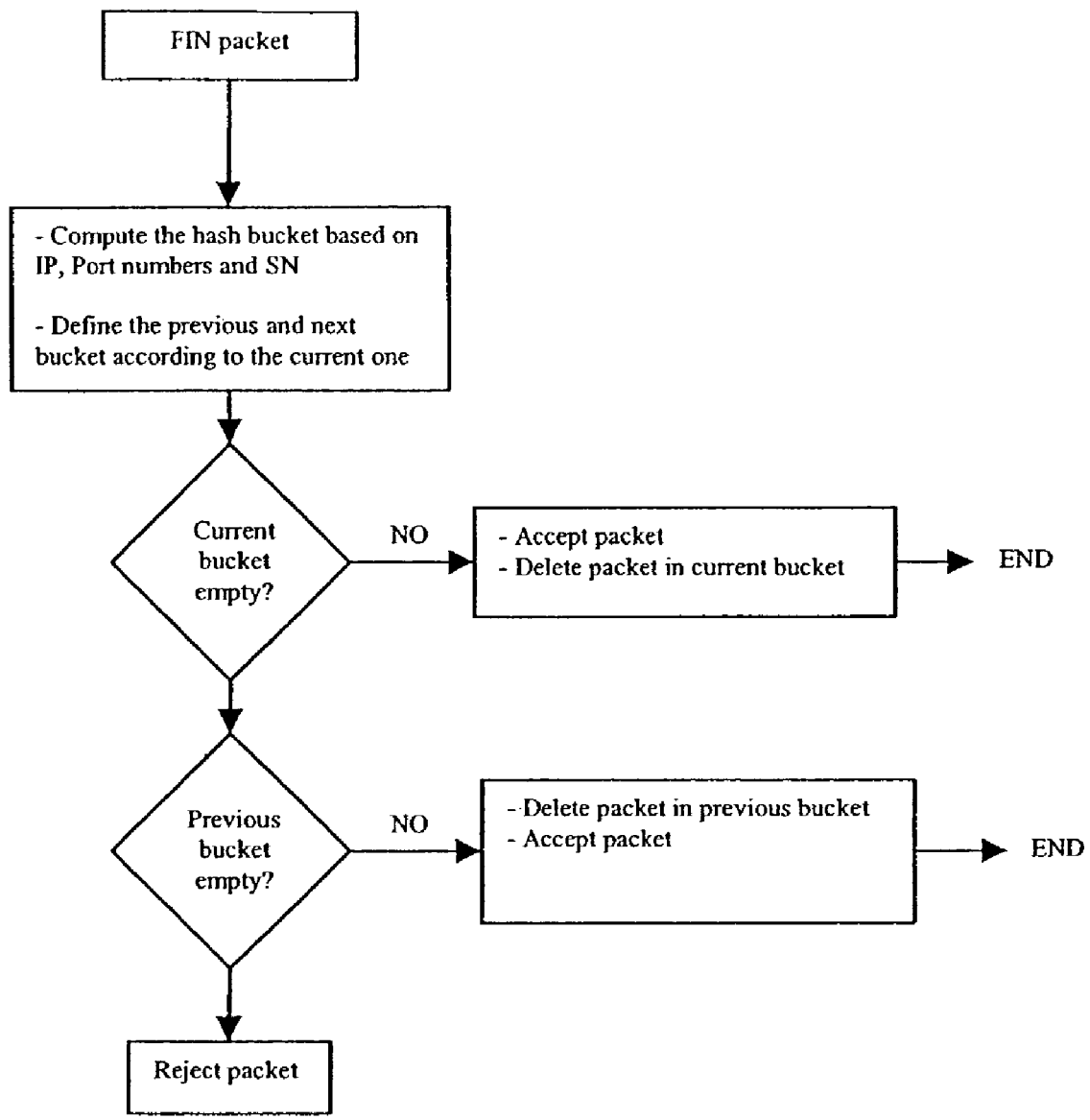

FIG. 3B illustrates the process when a incoming packet is a FIN packet or RST packet. In this case the hash bucket is calculated based on IP port numbers and the sequence number. Again the previous and next and next buckets are defined in accordance with the current one. If the current bucket is not empty the packet is accepted. If the current bucket is empty and the previous bucket is not empty the packet in the previous bucket is deleted and the new packet is accepted. Otherwise the packet is rejected.

A variant of this algorithm is to base the computation on the acknowledgment numbers instead of the sequence numbers. This variant is based on the fact that most TCP/IP stack implementations set the ACK flag on each packet—except on the initial SYN packet.

This has a major advantage if a server trusts its own choice of the Initial Sequence Number but not the one of the client. This approach will prevent two malicious attackers using the same Initial Sequence Numbers to interfere each other with the server. Therefore, the server establishes the correspondence by using its own Initial Sequence Number and the Acknowledge Numbers sent by the client.

The mechanism according to the present invention provides a stronger correspondence than the hashing solution which does not consider the sequence numbers. This results in a faster solution than the aforementioned obvious solution simulating the TCP window algorithm. In any event that such a solution would use a hashing function to maintain the data structures keeping the sequence numbers.

Denial-Of-Service attacks have become an increasingly prevalent form of security threat, and the problem appears to be quite difficult to solve because the attacks prey on intrinsic properties of the TCP/IP infrastructure. The present invention provides a means of detecting denial-of-service attacks that is more efficient and robust than known methods.

Although specific embodiments have been described and illustrated it would be apparent to one skilled in the art that numerous changes can be introduced without departing from the basic concept. It is to be understood, however, that such changes, to the extent possible, fall within the full scope of the invention as defined by the appended claims.

I claim:

1. A method of detecting a denial of service attack on a connection in a digital communications system, the method comprising the steps of:
    providing a hash table, said hash table having a corresponding hash function and for storing a plurality of counters, each counter associated with an index of the hash table, each index calculated with use of said hash function;
    determining for a TCP SYN packet received, a first index of said hash table by adding a value dependent upon an initial sequence number of said TCP SYN packet to the hash function of a secret key and at least one header field of said TCP SYN packet;
    incrementing a first counter associated with said first index;
    selecting, based on a probability per packet received other than a SYN, FIN, or RST packet, a subsequent packet;
    determining for said subsequent packet selected, a second index of said hash table by adding a value dependent upon a sequence number of said subsequent packet to the hash function of said secret key and the at least one header field of said subsequent packet; and
    determining that there is a denial of service attack, if:
        a second counter associated with said second index;
        a third counter associated with a third index calculated from said second index minus one; and
        a fourth counter associated with a fourth index calculated from said second index plus one
    are all zero.

2. A method according to claim 1 wherein if it is determined that there is a denial of service attack, the subsequent packet is discarded.

3. A method according to claim 1 wherein said hash table supports insertion, deletion, and query operations.

4. A method according to claim 1 wherein said at least one header field of said TCP SYN packet comprises source IP address, destination IP address, source port, and destination port header fields of the TCP SYN packet, and wherein said at least one header field of said subsequent packet comprises source IP address, destination IP address, source port, and destination port header fields of the subsequent packet.

5. A method according to claim 1 wherein said secret key is a random number known only to a detection system performing said detecting of a denial of service attack.

6. A method according to claim 1 further comprising:
    determining for a TCP FIN packet received, a fifth index of said hash table by adding a value dependent upon a sequence number of said TCP FIN packet to the hash function of the secret key and the at least one header field of said TCP FIN packet;
    decrementing a fifth counter associated with the fifth index if said fifth counter is nonzero;
    decrementing a sixth counter associated with a sixth index calculated from said fifth index minus one, if said fifth counter is zero and said sixth counter is nonzero; and
    discarding said TCP FIN packet if said fifth counter and said sixth counter are both zero.

7. A method according to claim 1 wherein said value dependent upon an initial sequence number of said TCP SYN packet is calculated according to Floor(initial sequence number/(TCP window size*t)) and wherein said value dependent upon a sequence number of said subsequent packet is calculated according to Floor(sequence number/(TCP window size*t)).

8. A method according to claim 7 wherein t is a confidence number equal to 2 to the power of 10.

9. A method according to claim 1 wherein the probability per packet received is 0.01.

10. A method according to claim 1 further comprising:
determining for a TCP FIN packet received, a fifth index of said hash table by adding a value dependent upon a sequence number of said TCP FIN packet to the hash function of the secret key and the at least one header field of said TCP FIN packet;
decrementing a fifth counter associated with the fifth index if said fifth counter is nonzero;
decrementing a sixth counter associated with a sixth index calculated from said fifth index minus one, if said fifth counter is zero and said sixth counter is nonzero; and
discarding said TCP FIN packet if said fifth counter and said sixth counter are both zero;
wherein if it is determined that there is a denial of service attack, the subsequent packet is discarded, wherein said at least one header field of said TCP SYN packet comprises source IP address, destination IP address, source port, and destination port header fields of the TCP SYN packet, wherein said at least one header field of said subsequent packet comprises source IP address, destination IP address, source port, and destination port header fields of the subsequent packet, wherein said at least one header field of said TCP FIN packet comprises source IP address, destination IP address, source port, and destination port header fields of the TCP FIN packet, wherein said secret key is a random number known only to a detection system performing said detecting of a denial of service attack, wherein said value dependent upon an initial sequence number of said TCP SYN packet is calculated according to Floor(initial sequence number/(TCP window size*t)), wherein said value dependent upon a sequence number of said subsequent packet is calculated according to Floor(sequence number/(TCP window size*t)), and wherein said value dependent upon a sequence number of said TCP PIN packet is calculated according to Floor(sequence number of said TCP FIN packet/(TCP window size*t)).

11. A method of detecting a denial of service attack on a connection in a digital communications system, the method comprising the steps of:
providing a hash table, said hash table having a corresponding hash function and for storing a plurality of counters, each counter associated with an index of the hash table, each index calculated with use of said hash function;
determining for a TCP SYN packet received, a first index of said hash table by adding a value dependent upon said TCP SYN packet to the hash function of a secret key and at least one header field of said TCP SYN packet;
incrementing a first counter associated with said first index;
selecting, based on a probability per packet received other than a SYN, FIN, or RST packet, a subsequent packet;
determining for said subsequent packet selected, a second index of said hash table by adding a value dependent upon an acknowledgement number of said subsequent packet to the hash function of said secret key and the at least one header field of said subsequent packet; and
determining that there is a denial of service attack, if:
a second counter associated with said second index;
a third counter associated with a third index calculated from said second index minus one; and
a fourth counter associated with a fourth index calculated from said second index plus one
are all zero.

* * * * *